United States Patent [19]

Hiroi et al.

[11] Patent Number: 4,563,735
[45] Date of Patent: Jan. 7, 1986

[54] PROCESS CONTROLLING METHOD AND SYSTEM INVOLVING SEPARATE DETERMINATION OF STATIC AND DYNAMIC COMPENSATION COMPONENTS

[75] Inventors: Kazuo Hiroi, Hachioji; Kojiro Ito, Machida, both of Japan

[73] Assignee: Tokyo Shibaura Denki Kabushiki Kaisha, Kawasaki, Japan

[21] Appl. No.: 477,384

[22] Filed: Mar. 21, 1983

[30] Foreign Application Priority Data

| Mar. 26, 1982 [JP] | Japan | 57-47349 |
| Mar. 26, 1982 [JP] | Japan | 57-47350 |
| Aug. 25, 1982 [JP] | Japan | 57-147155 |

[51] Int. Cl.[4] .................................... G06F 15/46
[52] U.S. Cl. .................................... 364/165; 364/160; 318/632
[58] Field of Search ............... 364/158, 159, 160, 161, 364/162, 163, 164, 165, 166, 176; 318/561, 632

[56] References Cited

U.S. PATENT DOCUMENTS

| 3,758,762 | 9/1973 | Littman et al. | 364/165 X |
| 3,767,900 | 10/1973 | Chao et al. | 364/164 X |
| 3,798,430 | 3/1974 | Simon et al. | 364/164 X |
| 3,939,328 | 2/1976 | Davis | 364/161 X |
| 4,313,165 | 1/1982 | Clelford et al. | 364/161 X |
| 4,319,320 | 3/1982 | Sato et al. | 364/165 |

FOREIGN PATENT DOCUMENTS 2743928 4/1979 Fed. Rep. of Germany.

OTHER PUBLICATIONS

"Process-Control Systems," F. G. Shinskey, pp. 235-237, 1967, McGraw-Hill, Inc.
Hippe et al, "Ein Einfaches Verhafren Stoergeoessenkompensation", 8129 Regelungstechnik, vol. 29, No. 3, Mar. 1981.

Primary Examiner—Jerry Smith
Assistant Examiner—Louis Woo
Attorney, Agent, or Firm—Schwartz, Jeffrey, Schwaab, Mack, Blumenthal & Evans

[57] ABSTRACT

A method and system of process control comprising in combination a feed-back control in which a deviation of a controlled variable with reference to a target value is applied to a velocity type controller and a manipulated variable is determined in accordance with the output of the controller and a feed-forward control in which a disturbance is detected and a disturbance compensation is determined and added in determining the manipulated variable to counteract the effect of the disturbance. A static compensation component and a dynamic compensation component of the disturbance compensation are separately determined in accordance with the detected disturbance, and the static compensation component is converted to a velocity type signal, and added to the output of the controller to obtain a first sum. The first sum is converted to a position type signal, and added to the dynamic compensation component to obtain a second sum, in accordance with which the manipulated variable is determined.

6 Claims, 12 Drawing Figures

FIG. 2
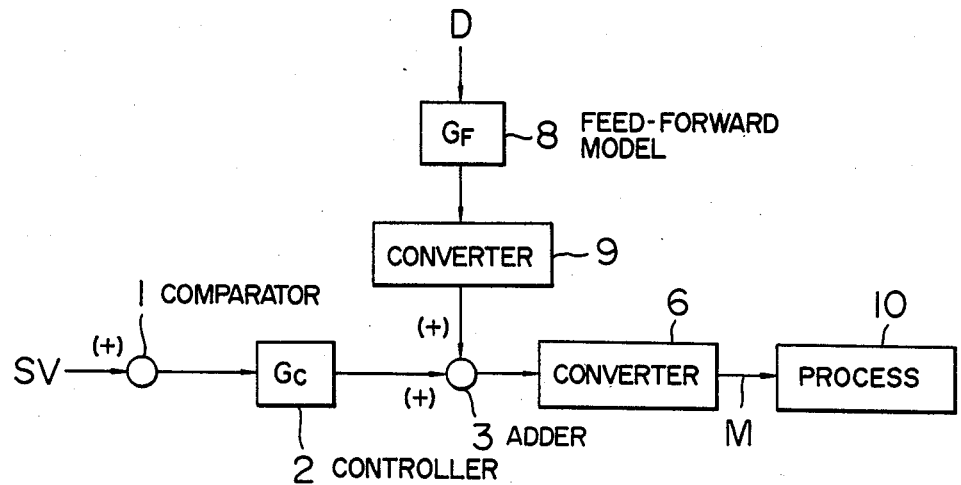
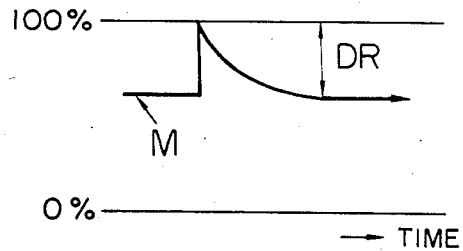
FIG. 3A
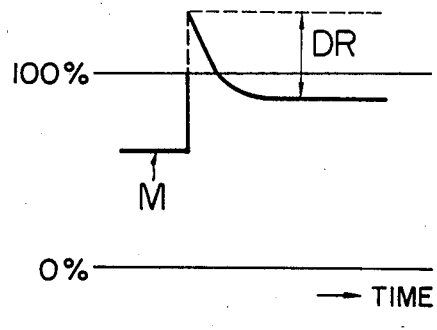
FIG. 3B

PROCESS CONTROLLING METHOD AND SYSTEM INVOLVING SEPARATE DETERMINATION OF STATIC AND DYNAMIC COMPENSATION COMPONENTS

BACKGROUND OF THE INVENTION

The present invention relates to a method and a system of process control comprising in combination a feed-back control and a feed-forward control, particularly useful in implementing a direct digital control.

In a process control system, a feed-back control system plays an important role, but the feed-back system operates responsive to the change in the controlled variable and executes a required correction only after the controlled variable deviates from a set value or target value. Therefore, there arises no problem when the controlled variable varies slowly, but the feed-back control system has the serious defect that its transient response is delayed when a sudden variation in disturbance occurs because the feed-back correction is made only after the controlled variable deviates from a target value. A solution to this problem is to use, in combination with the feed-back control system, a feed-forward control system in which disturbances are detected and a correction or compensation based on prediction is made before the controlled variable is actually affected.

FIG. 1 shows a fundamental control system comprising in combination a feed-back system and a feed-forward system. A comparator 1 compares a controlled variable with a target value and the result of this comparison, i.e., difference between the target value and the controlled variable, is fed to a PID controller 2. The output of the PID controller 2 is fed to an adder or sum node 3. Meanwhile a disturbance D, which is transmitted through an imaginary path 7 with a transfer function $G_D$, affects the controlled variable X. In order to compensate for or counteract the adverse effects of disturbance D on the controlled variable X, the disturbance D is transmitted through a feed-forward model 8 with a transfer function $G_F$ to the adder 3 to be added to the output from the controller 2. The resulting output from the adder 3 is fed as a manipulated variable to a controlled process 10, and the effect of the manipulated variable transmits through an imaginary path 4 with a transfer function $G_P$. The effect of the disturbance through the path 7 and the effect of the manipulated variable M are effectively added to become the controlled variable X. For illustration, this summation is shown to be effected by an adder or sum node 5.

Therefore, if the output from the controller 2 is designated by Y, the controlled variable X is given by $$X = (Y + D \cdot G_F) \cdot G_P + D \cdot G_D \quad (1)$$
$$= Y \cdot G_P + D \cdot (G_D + G_F \cdot G_P)$$

From equation (1) it is readily seen that, in order that the controlled variable X may be free from any adverse effects from the disturbance, the following condition must be satisfied:

$$G_D + G_F G_P = 0$$

It follows that the transfer function $G_F$ of the feed-forward model 8 must be $$G_F = -G_D/G_P \quad (2)$$

In general, the transfer functions $G_D$ and $G_P$ may be approximated in terms of a combination of a first-order time-lag and a dead time as follows:

$$G_P = \frac{K_P}{1 + T_P \cdot S} e^{-L_P \cdot S}$$

and $$G_D = \frac{K_D}{1 + T_D \cdot S} e^{-L_D \cdot S}$$

where
$K_P$ and $K_D$ are gain constants, respectively;
$T_P$ and $T_D$ are time constants, respectively; and
$L_P$ and $L_D$ are dead times, respectively.

It follows that the transfer function $G_F$ of the feed-forward model 8 is given by $$G_F = -\frac{G_D}{G_P} = -\frac{K_D}{K_P} \cdot \frac{1 + T_P \cdot S}{1 + T_D \cdot S} \times e^{-(L_D - L_P) \cdot S} \quad (3)$$

If the dead time of $G_P$ and dead time of $G_D$ are substantially the same, Eq. (3) may be rewritten in the form of $$G_F = -\frac{K_D}{K_P} \cdot \frac{1 + T_P \cdot S}{1 + T_D \cdot S} \quad (4)$$

The thus simplified equation (4) is often used in practical applications. However, it sometimes occurs that the characteristic of the particular process on which the feed-forward control is effected is not correctly approximated by the first order equation (4), or the characteristic of the process is not linear. In addition, the process control system has various limitations and is subjected to various conditions. As a result, the prior art feed-forward system has encountered the following problems:

(1) It is not possible to set or adjust, independently of each other, gains of the static and dynamic compensation components of the disturbance compensation, while such independent setting is desirable to adapt the system to the process characteristics. It is noted, in this connection, that setting of the gain can involve setting different gains for different directions of changes (increase and decrease) i.e., different polarities or signs of the compensation value;

(2) It is not possible to provide a dead band or zone only for the static compensation component alone or dynamic compensation component alone. The provision of dead zone nullifies the feed-forward control while the change of the disturbance is small.

It is not possible to set the dead zones of the two components independently of each other;

(3) It is not possible to provide upper and lower limits to the static compensation component alone or to the dynamic compensation component alone. It is not possible to set the limit values of the two components independently of each other;

(4) It is difficult to achieve a "bumpless" switching when the controller 2 is switched between the automatic and manual controls (especially where a velocity type controller is in use); and (5) It is difficult to analyze and understand the qualitative significance of the feed-forward control, so that the adjustment of the controller is difficult.

Moreover, where a velocity type PID controller is used, the prior art feed-forward system has the following drawbacks.

As shown in FIG. 2, where the PID controller 2 is of a velocity type, the output of the feed-forward model 8 is converted by a position type to velocity type converter or a difference detector 9 before being applied to the adder 3. The output of the adder 3 is then converted by a velocity type to position type converter 6 and is thereafter used as the manipulated variable M of the process.

Upon relatively large stepping change in the disturbance, the manipulated variable M will change as shown in FIG. 3A whereas what is desirable is as shown in FIG. 3B. This is because the converter 6 does not follow increase further than its maximum (100%) while its output begins to drop immediately when the input becomes negative, and hence the amount DR of the total drop from the 100% level in FIG. 3A equals the amount DR of the total drop from the desirable peak in FIG. 3B. Such characteristics are given to the converter 6 for the purpose of cancelling or counteracting reset windup effects of the controller 2. Thus, the actual response (FIG. 3A) differing from the desirable response (FIG. 3B) has adverse effects on the process control.

A similar situation, but with opposite polarity, will occur when the direction of the change is opposite and the desirable output of the converter 6 exceeds the lower limit of 0%.

Furthermore, the prior art feed-forward system has the following shortcomings. That is, in the above-described analysis of the feed-forward control system, it has been assumed that the gain coefficient $K_D$ of the transfer function $G_D$ of the disturbance D is constant and consequently that the gain coefficient $K_F = K_D/K_P$ of the feed-forward model 8 is constant. Actually, however, the disturbance coefficient $K_D$ is not fixed and varies irregularly and widely depending upon such factors as indirect disturbances, variations in characteristics with the passage of time, variations in physical quantities inside and outside of the process control system, variations of chemical compositions, variations in ambient temperature, disturbances which are not detected, or cannot be detected and so on. As a result, the feed-forward control system cannot attain desired effects and may adversely affect the process control.

Meanwhile, because of diversity of raw materials, fuels and products, variations in load due to variations in the rate of operation made in view of changes in economical conditions, increasing demand for multi-purpose system and the like, there has been an increasing demand for flexibility of the process and hence the control system. This situation is explained in further detail taking, as an example, control on the temperature at the outlet of a heat-exchanger system with reference to FIG. 4.

In FIG. 4, a raw material 11 is fed through a feed line 12 to a heat-exchanger 14, heated by the steam, and is discharged therefrom. A temperature sensor 15 detects the outlet temperature $T_0$ of the heat-exchanger 14 and generates a signal representative of the detected outlet temperature $T_0$. This signal is applied to a temperature controller 19, which controls the heat-exchanger system to maintain the outlet temperature $T_0$ at a predetermined level.

A flow-rate sensor 13 detects the flow rate Fi of the raw material 11 and generates a signal representative of the detected flow rate Fi. This signal is applied to a feed-forward model 21. The output from the feed-forward model 21 and the output from the temperature controller 19 are added in an adder 20, which applies the sum signal, as a target value, to a steam flow-rate controller 22. The steam flow-rate controller 22 receives the output of the steam flow rate sensor 17 as a feed-back signal and executes control operations for maintaining the feed-back signal at the target value. The output from the steam flow-rate controller 22 is used to control a control valve 18. In this way, the outlet temperature $T_0$ of the heat exchanger 14 is maintained constant.

The transfer function $G_F$ of the feed-forward model 21 will now be discussed. First, the heat balance Q in the steady state of the process is obtained by the following equation:

$$Q = Fs \cdot Hs = \frac{1}{\eta} \cdot Fi \cdot Ci \cdot (Ts - Ti) \tag{5}$$

where
  Fs is the flow rate in weight of steam;
  Hs is the latent heat of the steam;
  Fi is the flow rate of the raw material;
  Ci is the specific heat of the raw material;
  Ts is the set or target value for the temperature at the outlet of the heat-exchanger;
  Ti is the temperature at the inlet of the heat-exchanger; and
  $\eta$ is the efficiency of the heat-exchanger.

Eq. (5) is rewritten so as to obtain the steam flow rate Fs which is the controlled variable. Then, $$Fs = \frac{1}{\eta} \cdot \frac{Ci}{Hs} \cdot (Ts - Ti) \cdot Fi \tag{6}$$

From Eq. (6), the static compensation component $G_{FS}$ of the feed-forward model 21 is obtained as follows:

$$G_{FS} = \frac{Fs}{Fi} = \frac{1}{\eta} \cdot \frac{Ci}{Hs} \cdot (Ts - Ti) = K_F \tag{7}$$

The transfer function $G_F$ with the dynamic compensation component of the feed-forward model 21 is $$G_F = \frac{1}{\eta} \cdot \frac{Ci}{Hs} \cdot (Ts - Ti) \cdot \left( \frac{1 + T_P \cdot S}{1 + T_D \cdot S} \right) \tag{8}$$

where
  $T_D$ is the time constant from the raw material flow rate sensor 13 to the outlet temperature sensor 15; and
  $T_P$ is the time constant from the time when the steam flow rate is set (that is, when the output is derived from the adder 20) to the time when the temperature at the outlet of the heat-exchanger 14 is affected by this set flow rate.

So far, only the variation in raw material flow rate Fi is considered as disturbance affecting the feed-forward control system and it has been assumed that $$K_F = \frac{1}{\eta} \cdot \frac{Ci}{Hs} \cdot (Ts - Ti)$$

be constant, but actually $K_F$ varies irregularly over a wide range depending upon the following factors:

(1) the variations in temperature of raw material;
(2) the variations in efficiency of the heat-exchanger;
(3) the variations in the latent heat of the steam;
(4) the variations in ambient temperature; and
(5) the variations of the specific heat of raw material.
As a result, the feed-forward system cannot attain satisfactory results. More particularly, the controllability is adversely affected when raw material flow rate varies. This results in fluctuation of the product quality.

As described above, in the prior art combined feed-back and feed-forward control system, satisfactory effects cannot be attained and adverse effects are sometimes brought about. This problem is thus becoming more and more serious as the demand for the flexibility of the process grows.

SUMMARY OF THE INVENTION

An object of the present invention is to provide a method and a system of process control which can substantially eliminate the above and other defects encountered in the prior art methods and systems.

Another object of the present invention is to provide a method and a system of process control whose qualitative characteristics may be easily analyzed and understood so that the adjustment of control for attaining an optimum is easy.

A further object of the present invention is to provide a method and a system of process control which can attain optimum results in conformity with characteristics of controlled quantities or values.

A still further object of the present invention is to provide a method and a system of process control which can accomplish optimum compensations for any disturbances.

According to one aspect of the invention, there is provided a method of process control comprising in combination a feed-back control in which a deviation of a controlled variable with reference to a target value is applied to a velocity type controller and a manipulated variable is determined in accordance with the output of the controller and a feed-forward control in which a disturbance is detected and a disturbance compensation is determined and added in determining the manipulated variable to counteract the effect of the disturbance, said method comprising the steps of:

(a) determining, in accordance with the detected disturbance, a static compensation component and a dynamic compensation component of the disturbance compensation, (b) converting the static compensation component to a velocity type signal, (c) adding the converted static compensation component to the output of the controller to obtain a first sum, (d) converting the first sum to a position type signal, (e) adding the dynamic compensation component to the converted first sum to obtain a second sum, and (f) determining, in accordance with the second sum, the manipulated variable.

According to another aspect of the invention, there is provided a process control system comprising in combination a feed-back control system having a velocity type controller and determining a manipulated variable in accordance with the output of the controller, and a feed-forward control system having means for detecting a disturbance and determining, in accordance with the detected disturbance, a disturbance compensation to be added in determining the manipulated variable to counteract the effect of the disturbance, said process control system comprising:

(a) disturbance compensation determining means determining, in accordance with the detected disturbance, a static compensation component and dynamic compensation component of the disturbance compensation, (b) position type to velocity type converting means for converting the static compensation component into a velocity type signal, (c) first adding means for adding the output of the position type to velocity type converting means and the output of the controller to obtain a first sum, (d) velocity type to position type converting means for converting the first sum into a position type signal, and (e) second adding means for adding the dynamic compensation component and the output of the velocity type to position type converting means to obtain a second sum, wherein the second sum is used for determining the manipulated variable.

BRIEF DESCRIPTION OF THE DRAWINGS

FIG. 2 is a block diagram showing part of another conventional process control system with a velocity-type to position-type converter;

FIGS. 3A and 3B are time charts showing the operation of the system of FIG. 2;

DETAILED DESCRIPTION OF THE PREFERRED EMBODIMENTS

Figure 1:
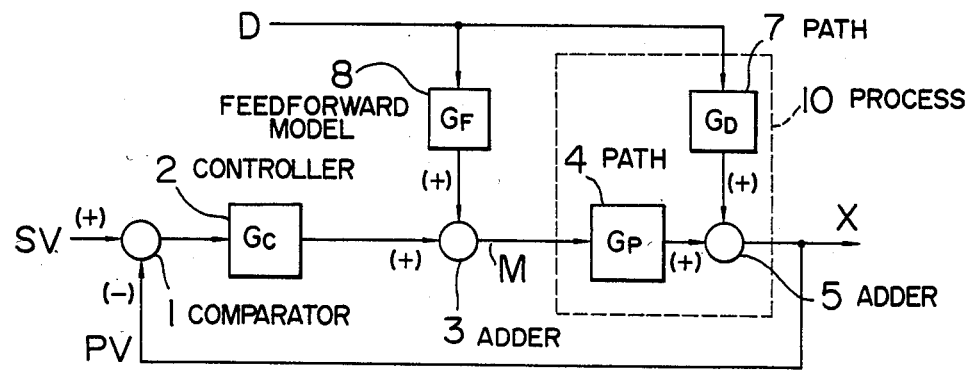
FIG. 1 is a block diagram showing a conventional process control system.
Figure 4:
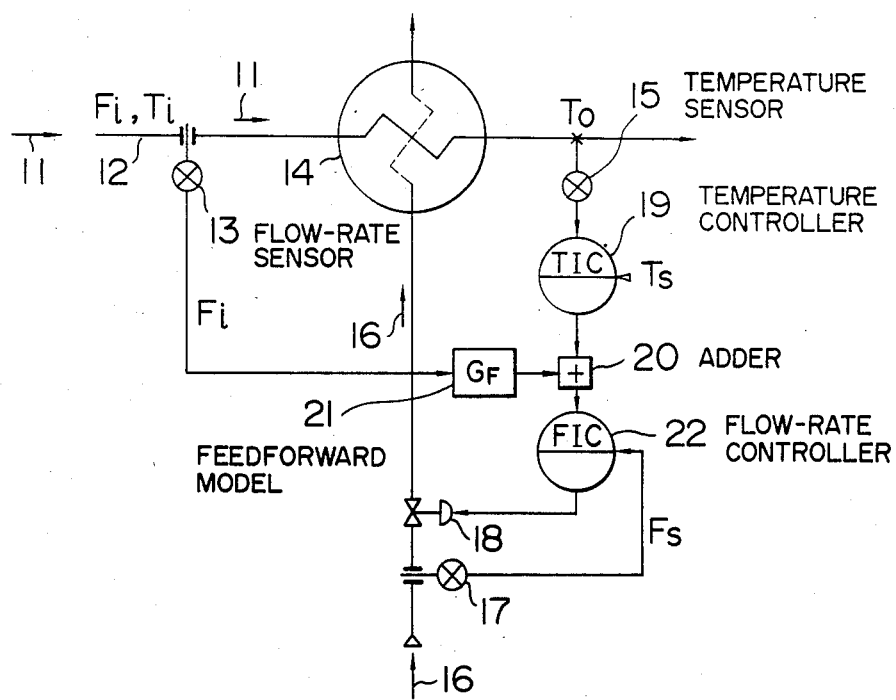
FIG. 4 is a diagram showing an example of a heat exchange system with a process control apparatus.
Figure 5:
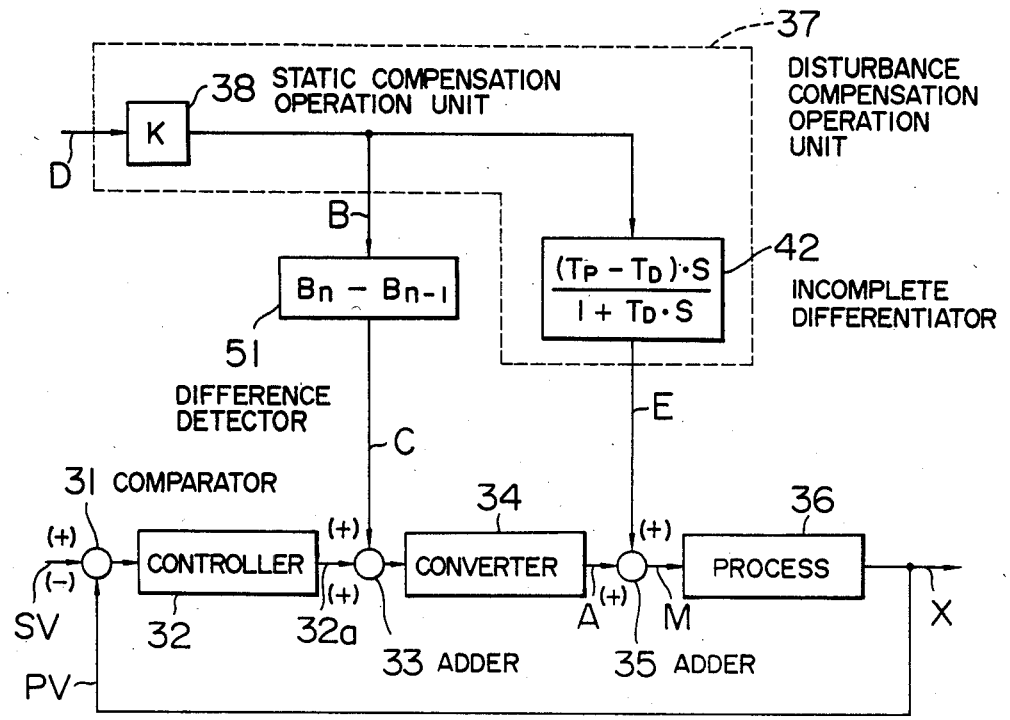
FIG. 5 is a block diagram showing an embodiment of a process control apparatus according to the invention.

FIG. 5 shows an embodiment of the present invention having a velocity-type controller in its feed-back system.

A process variable PV which is obtained as a result of the detection of a controlled variable X is fed back to a comparator 31 and is compared with a target value SV. The resulting error, i.e., the deviation of the process variable PV with reference to the target value SV is applied to a controller 32 which executes control operations required for any one or combination of control actions for P (proportional), I (integral) and D (derivative). The output 32a from the controller 32 is applied through a first adder 33, a velocity type - position type signal converter 34 and a second adder 35 to a process 36 as a manipulated variable M. Thus, a feed-back system is formed which feeds the controlled variable X back to the comparator 31 for the control of the process 36.

On the other hand, for feed-forward control, a disturbance signal D is fed to a disturbance compensation unit 37 so that a static compensation component B and a dynamic compensation component E are obtained. The disturbance compensation unit 37 comprises a static compensation component operation unit 38 and an incomplete differentiator 42 which obtains the dynamic compensation component E by executing the incomplete differentiation of the static compensation component B derived from the operation unit 38.

The reason why the static and dynamic compensation components B and E are obtained in this way will be now explained. Rewriting Eq. (4), we have $$G_F = -\frac{K_D}{K_P} \cdot \left\{ 1 + \frac{(T_P - T_D) \cdot S}{1 + T_D \cdot S} \right\} \quad (9)$$

$$= -\frac{K_D}{K_P} - \frac{K_D}{K_P} \cdot \frac{(T_P - T_D) \cdot S}{1 + T_D \cdot S}$$

The first term of the right side represents the static compensation component B. More particularly, the transfer function or coefficient of the static compensation operation unit 38 is the first term mentioned and the unit 38 delivers the product of its input and the transfer function. The second term of the right side represents the dynamic compensation component; that is, the product of the static compensation component B and the following expression $$\frac{(T_P - T_D) \cdot S}{1 + T_D \cdot S} \quad (10)$$

More particularly, the dynamic compensation component B can be obtained by applying the output from the static compensation component operation unit 38 to the incomplete differentiator 32 which has the transfer function expressed by Eq. (10).

The static compensation component B is applied to a subtractor or difference detector 51 which obtains the difference between a static compensation component $B_n$ obtained at the latest (or present) sampling instant and the static compensation component $B_{n-1}$ obtained at the preceding sampling instant, whereby the static compensation component B can be converted into a velocity type. The output from the difference detector 51 is applied to the second adder 33 and is added to the output 32a from the controller 32. The sum is applied to a converter 34 which converts the sum into a position type signal A. More particularly, the converter 34 effects the velocity-to-position conversion by accumulating the inputs at respective sampling times; that is, by adding the input obtained at one or latest sampling instant to the sum of the inputs previously sampled and accumulated.

The dynamic compensation component or the output from the incomplete differentiator 42 is applied to a third adder 35 to be added to the signal A. The sum or the output from the third adder 35 is applied as a manipulated variable M to a process or controlled system 36 to control the controlled variable X.

Figure 6:
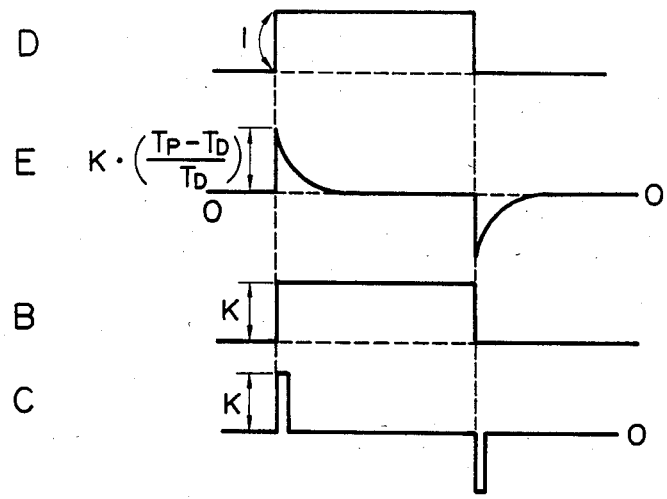
FIG. 6 is a time chart operation of the apparatus of FIG. 5.

The operation of the embodiment shown in FIG. 5 will be described with reference to FIG. 6. When the disturbance D changes by a unit "1" (a unit step), the output B from the static compensation operation unit 38, the output C from the difference detector 51 and the output E from the incomplete differentiator 42 respond as shown in FIG. 6. It is seen that in response to the variation in disturbance D, the output E of the incomplete differentiator 42 varies about the zero (0) level; that is, it rises in response to the rise of the disturbance, then falls to 0, drops and goes negative in response to the fall of the disturbance D and rises to zero. The output E remains zero as long as the disturbance D is constant. The output B from the operation unit 38, which is of a position type, is converted into a velocity type by the difference detector 51. The output C from the difference detector 51 immediately rises and falls to zero in response to the rise of the disturbance D and falls below zero and immediately rises back to zero in response to the fall of the disturbance D. As long as the disturbance D remains constant, the output C also remains constant or zero.

As described above, according to the present invention, the outputs B and C which represent the static compensation component and the output E representing the dynamic compensation component can be obtained independently of each other so that the analysis of the qualitative characteristics of the system can be considerably facilitated. In addition, a suitable gain (which may be different in magnitude depending upon the direction in which the disturbance is increased or decreased) and a suitable dead band may be determined independently for each of the static and dynamic compensation components.

Moreover, where a difference detector 51 is used to provide the signal C, not only the signal E representing the dynamic compensation component but also the signal C representing the static compensation component substantially remain zero if the disturbance D remains constant. Therefore, polygonal line function generators may be inserted to receive the signals C and E, respectively, and to apply the outputs to the second and third adders 33 and 35, respectively. Accordingly, different dead bands can be set for static and dynamic compensation components.

Figure 7:
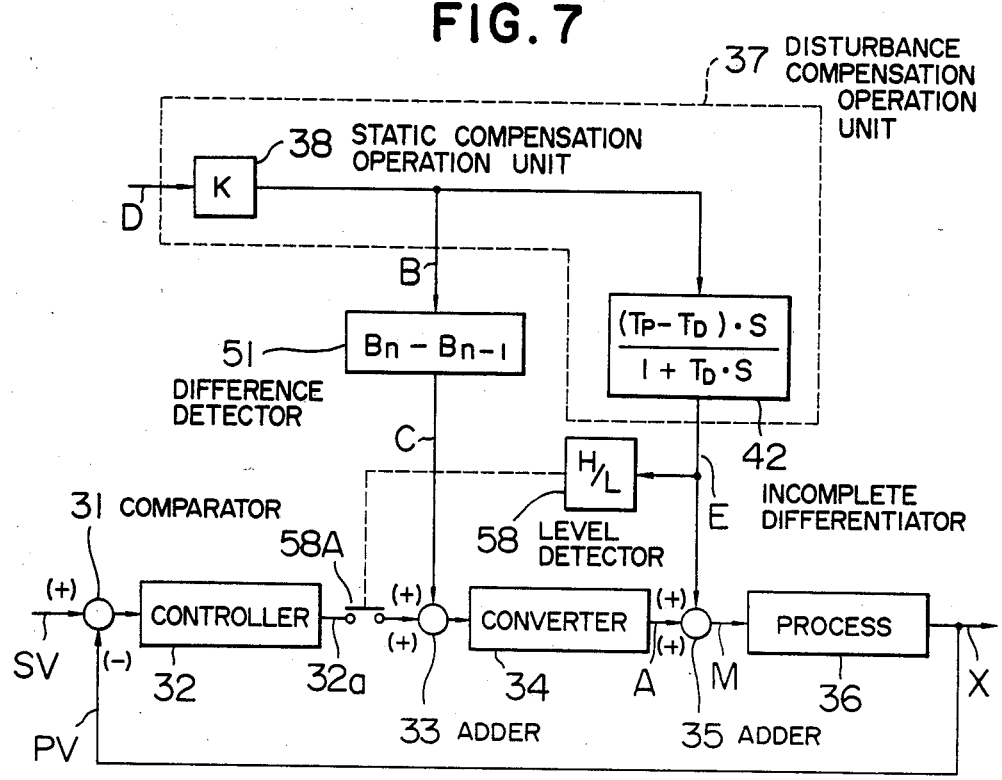
FIG. 7 is a block diagram showing another embodiment of the invention.

FIG. 7 shows another embodiment similar to the embodiment of FIGS. 5 and 6 except that a level detector 58 is connected to detect the level of the output E from the incomplete differentiator 42, and that a switch 58A is provided to be responsive to the detector 58 for establishing or breaking the connection between the controller 32 and the second adder 33 depending upon whether the output E representing the dynamic compensation component from the incomplete differentiator 42 is lower or higher than a predetermined value.

Figure 8:
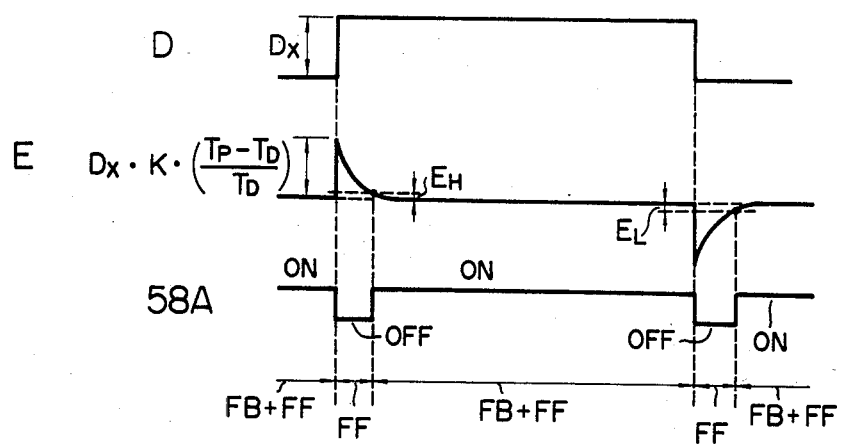
FIG. 8 is a time chart showing operation of the apparatus of FIG. 7.

In operation, when the output E is between the upper limit $E_H$ and the lower limit $E_L$ in FIG. 8, the switch 58A closes or establishes the connection between the controller 32 and the second adder 33 so that both the feedback control (in response to the error signal derived from the comparator 31) and the feedforward control (in response to the detection of disturbance D) are effective. On the other hand, if the output E deviates from the range between the upper and lower limits $E_1$ and $E_H$, the switch 58A interrupts the connection between the controller 32 and the second adder 33 so that the feedback control is interrupted while the feed-forward control alone continues to compensate for disturbance D. Therefore, the embodiment of FIG. 7 has an advantage over the embodiment of FIG. 5 in that the feed-forward control system making an optimum prediction correction in response to sudden large variation in disturbance D is not affected by PID control action of the feed-back system.

Figure 9:
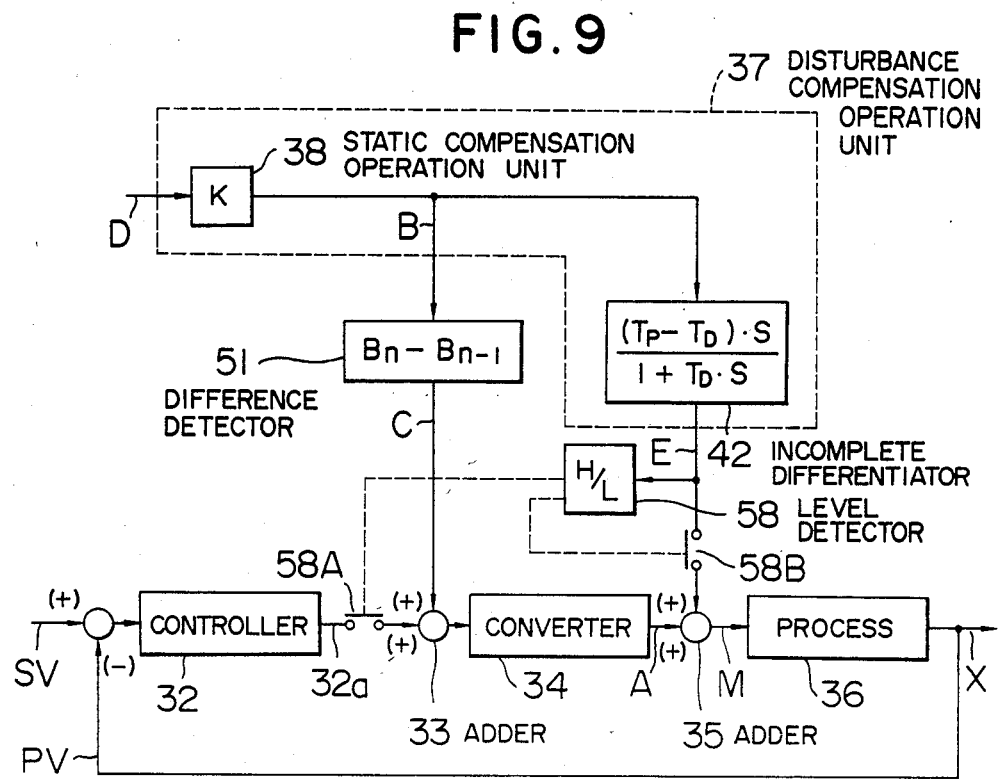
FIGS. 9 and 10 are block diagrams showing further embodiments of the invention.

FIG. 9 shows a further embodiment of the invention, which is similar to the embodiment of FIGS. 7 and 8 except that a second switch 58B is added which makes or breaks the connection between the incomplete differentiator 42 and the third adder 35 depending upon whether the output signal E from the incomplete differentiator 42 is higher or lower than a predetermined level.

The additional switch 58B serves to prevent application of the dynamic compensation component to the adder 35 when the dynamic compensation is relatively small. It can be said that the function of the switch 58B is similar to that of a function generator with a dead band.

Figure 10:
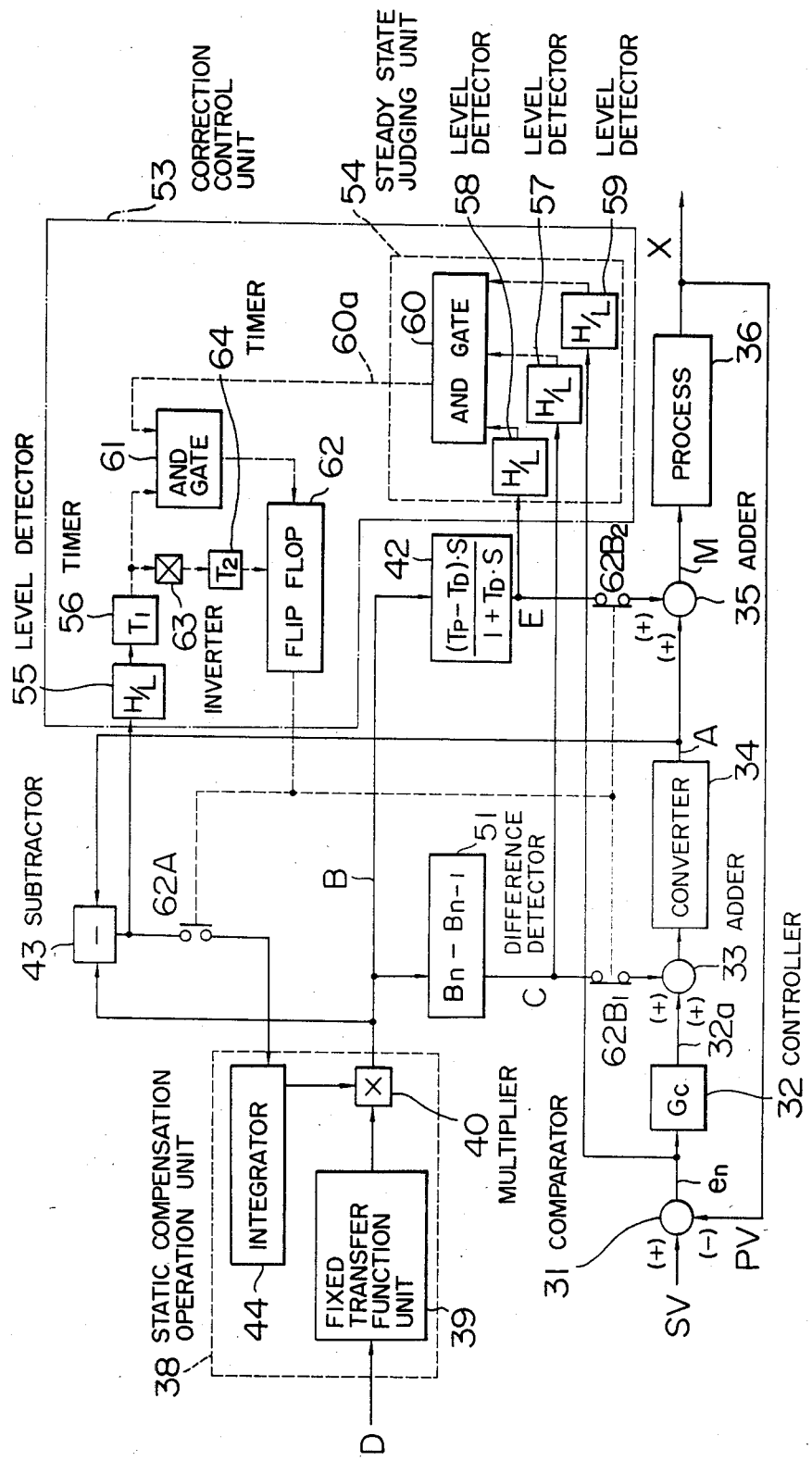

FIG. 10 shows a further embodiment of the invention which is fundamentally similar to the embodiment of FIG. 9. But the embodiment of FIG. 10 has an arrangement wherein the transfer function of the static compensation component operation unit 38 can be modified when the control system is in the steady or stable state. This embodiment has the following additional features.

The operation unit 38 comprises a fixed transfer function unit 39, a multiplier 40 and an integrator 44. The integrator 44 keeps integrating an output from a subtractor 43 when a switch 62A is closed. The multiplier 40 generates the product of the outputs from the fixed transfer function unit 39 and the integrator 44 and produces a signal B representing the static compensation component.

The subtractor 43 determines the difference between the output B from the operation unit 38 and the output A from the converter 34.

The switch 62A as well as switches 62B1 and 62B2 are controlled by the output of a flip-flop 62 in a correction control unit 53.

The correction control unit 53 includes a steady state judging unit 54 for judging whether or not the control system is in steady state. The unit 54 includes first, second and third level detectors 57, 58 and 59. The first level detector 57 is connected to receive the output C of the difference detector 51 and adapted to generate a "high" level signal when the output C is smaller than a predetermined level. The second level detector 58 is connected to receive the output E of the incomplete differentiator 42 and generates a "high" level signal when the output E is smaller than a predetermined level. The third level detector 59 is connected to receive the output $e_n$ of the comparator 31 and generates a "high" level signal when the output $e_n$ is smaller than a predetermined level. An AND gate 60 receives the outputs from the first, second and third level detectors 57, 58 and 59 and delivers a signal 60a indicating that the control system is maintained in the steady state, when the input signals from the first, second and third level detectors 57, 58 and 59 are simultaneously at a "high" level.

A level detector 55 is connected to receive the output of the subtractor 43 and generates a "high" level signal if the output from the subtractor 43 is greater than a predetermined level. An on-delay timer 56 produces a signal which rises upon expiration of a certain time after the rise of the output of the level detector 55. The output from the timer 56 is applied to both the second AND gate 61 and an inverter 63. The second AND gate 61 generates a "high" level signal when the output 60a of the AND gate 60 and the output of the timer 56 are simultaneously at a "high" level. The flip-flop 62 is set by the "high" level output of the AND gate 61.

An inverter 63 inverts the output of the timer 56. A timer 64 produces a signal which rises upon expiration of a certain time after the rise of the output of the inverter 63. The flip-flop 62 is reset by the "high" level output of the timer 64.

As long as the flip-flop 62 remains in the set state, the switch 62A establishes the connection between the subtractor 43 and the integrator 44 so that the output from the subtractor 43 is integrated. The output of the integrator 44 is applied to the multiplier 40 and multiplied with the output from the fixed transfer function unit 39 so that the transfer function of the operation unit 38 varies accordingly. Simultaneously with the closing of the switch 62A, the switches 62B1 and 62B2 are opened so that the outputs from the difference detector 51 and the incomplete differentiator 42 will not be applied to the second and third adders 33 and 35, and consequently the feed-forward control is interrupted.

The level detector 55 is provided to permit modification of the disturbance compensation only when the difference signal delivered from the subtractor 43 is greater than a predetermined level. When the difference signal is small and negligible, the level detector 55 prevents modification of the disturbance compensation.

The timer 56 which is connected to the level detector 55 is provided to initiate the correction of the disturbance compensation only after the output from the subtractor 43 continues to be large for a certain time interval. Therefore, even if the difference signal rises for a very short time interval due, for example, to noise, no correction will be made.

The timer 64 is provided to enable termination of the correction to be a short time after the difference signal becomes lower than the predetermined level.

As described above, according to the embodiment of FIG. 10 correction of the transfer function of the operation unit 38 is enabled in such a manner that the static compensation component approaches the output A when the control system is in the steady state. Accordingly, compensation for disturbance can be optimized.

Instead of varying the coefficient of the operation unit 38, the bias applied to the operation unit 38 may be varied to attain similar effects.

Figure 11:
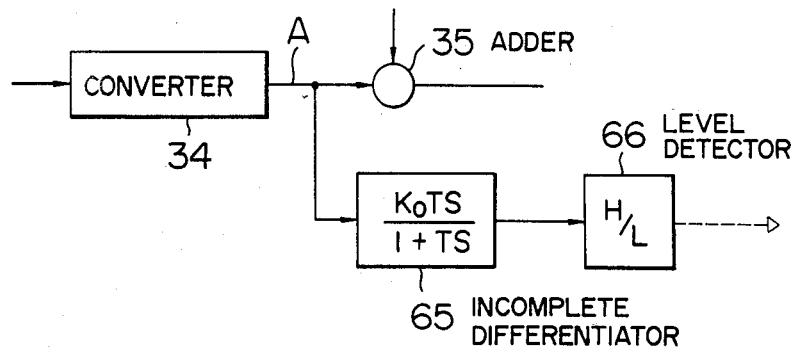
FIG. 11 is a block diagram showing a modification of part of the embodiment of FIG. 10.

In the embodiment of FIG. 10, the control system is found to be in the steady state when the error signal $e_n$, the output C from the difference detector 51 and the output E from the incomplete differentiator 42 are smaller than their respective predetermined levels. But it is to be understood that any other suitable variables or parameters may be used for judgement as to whether or not the control system is in the steady state. For instance, the arrangement may be as shown in FIG. 11, where the output A from the converter 34 is fed to an incomplete differentiator 65 and the output of the latter is applied to a level detector 66 judging whether the output is greater or smaller than a predetermined level. Whether or not the control system is in the steady state can be judged in accordance with the result of the judgement by the level detector 66.

The component parts of the control systems of the types described above may be either of analog or digital type, may be formed of discrete components or may be in the form of a programmed computer.

What is claimed is:

1. A method of process control comprising in combination a (1) feed-back control in which a deviation of a controlled variable with reference to a target value is applied to a velocity type controller and a manipulated variable is determined in accordance with the output of the controller and a (2) a feed-forward control in which a disturbance is detected and a disturbance compensation is determined and used with the output of the controller in determining the manipulated variable to counteract the effect of the disturbance, said method comprising the steps of:

(a) determining, in accordance with the detected disturbance, a static compensation component and a dynamic compensation component of the disturbance compensation, (b) converting the static compensation component to a velocity type signal, (c) adding the converted static compensation component to the output of the controller to obtain a first sum, (d) converting the first sum to a position type signal, (e) adding the dynamic compensation component to the converted first sum to obtain a second sum, and (f) determining, in accordance with the second sum, the manipulated variable.

2. A method as set forth in claim 1, wherein the determination of said dynamic compensation component is achieved by executing incomplete differentiation on said static compensation component.

3. A method as set forth in claim 1, wherein when the dynamic compensation component is greater than a predetermined value, the output of the controller is ignored and the manipulated variable is determined solely in accordance with the disturbance compensation.

4. A process control system comprising in combination a (1) feed-back control system having a velocity type controller, and determining a manipulated variable in accordance with the output of the controller, and a (2) feed-forward control system having means for detecting a disturbance and determining, in accordance with the detected disturbance, a disturbance compensation to be used with the output of the controller in determining the manipulated variable to counteract the effect of the disturbance, said process control system comprising:

(a) disturbance compensation determining means determining, in accordance with the detected disturbance, a position type static compensation component and a dynamic compensation component of the disturbance compensation, (b) position type to velocity type converting means for converting the static compensation component into a velocity type signal, (c) first adding means for adding the output of the position type to velocity type converting means and the output of the controller to obtain a velocity type first sum, (d) velocity type to position type converting means for converting the first sum into a position type signal, and (e) second adding means for adding the dynamic compensation component and the output of the velocity type to position type converter to obtain a second sum, wherein the second sum is used for determining the manipulated variable.

5. A system as set forth in claim 4, wherein said disturbance compensation determining means comprises static compensation component determining means determining, in accordance with the detected disturbance, the static compensation component, and incomplete differentiation means for executing incomplete differentiation on the static compensation component to produce the dynamic compensation component.

6. A system as set forth in claim 4, further comprising means for inhibiting the application of the output of the controller to said first adding means when the dynamic compensation component is greater than a predetermined value.

* * * * *